US006782974B2

(12) United States Patent
Leifer (10) Patent No.: US 6,782,974 B2
(45) Date of Patent: Aug. 31, 2004

(54) SERVER CALL SYSTEM

(76) Inventor: Richard Leifer, 11 Beaumont Dr., Melville, NY (US) 11747

( * ) Notice: Subject to any disclaimer, the term of this patent is extended or adjusted under 35 U.S.C. 154(b) by 0 days.

(21) Appl. No.: 10/420,457

(22) Filed: Apr. 23, 2003

(65) Prior Publication Data

US 2003/0178258 A1 Sep. 25, 2003

Related U.S. Application Data

(60) Division of application No. 09/797,764, filed on Mar. 5, 2001, now abandoned, which is a continuation-in-part of application No. 09/567,454, filed on May 8, 2000, now Pat. No. 6,681,109.

(51) Int. Cl.[7] .................................................. G08B 5/00
(52) U.S. Cl. ...................................................... 186/35
(58) Field of Search ............................. 186/35, 36, 38, 186/39; 455/414.1, 426.1, 41.2

(56) References Cited

U.S. PATENT DOCUMENTS

| | | | | | |
|---|---|---|---|---|---|
| 4,415,065 A | * | 11/1983 | Sandstedt | ...................... | 705/34 |
| 4,471,218 A | * | 9/1984 | Culp | ...................... | 235/462.46 |
| 4,516,016 A | * | 5/1985 | Kodron | ................. | 235/462.49 |
| 4,547,851 A | * | 10/1985 | Kurland | ........................ | 705/15 |
| 4,569,421 A | * | 2/1986 | Sandstedt | ...................... | 186/39 |
| 4,638,312 A | * | 1/1987 | Quinn et al. | .................. | 340/5.9 |
| 4,722,053 A | * | 1/1988 | Dubno et al. | .................. | 463/42 |
| 4,935,720 A | * | 6/1990 | Kalfoun | ................. | 340/286.09 |
| 5,003,472 A | * | 3/1991 | Perrill et al. | ................... | 705/15 |
| 5,828,294 A | * | 10/1998 | Shank | ......................... | 340/326 |
| 5,838,798 A | * | 11/1998 | Stevens, III | ................. | 705/21 |
| 5,875,256 A | * | 2/1999 | Brown et al. | ............... | 382/186 |
| 6,055,333 A | * | 4/2000 | Guzik et al. | ............... | 382/187 |
| 6,493,464 B1 | * | 12/2002 | Hawkins et al. | ............. | 382/189 |
| 6,633,672 B1 | * | 10/2003 | Guzik et al. | ............. | 382/189 |
| 2002/0025796 A1 | * | 2/2002 | Taylor et al. | ............... | 455/406 |
| 2002/0187774 A1 | * | 12/2002 | Ritter et al. | ................ | 455/414 |
| 2002/0193099 A1 | * | 12/2002 | Paulsen | ..................... | 455/414 |
| 2003/0114146 A1 | * | 6/2003 | Benson | ........................ | 455/414 |

FOREIGN PATENT DOCUMENTS

| | | | | | |
|---|---|---|---|---|---|
| DE | 42.04.876 A1 | * | 8/1993 | ............ | G07G/1/14 |
| JP | 2-25999 A | * | 1/1990 | ............. | G07F/7/08 |
| JP | 6-111143 A | * | 4/1994 | ............ | G07G/1/14 |

* cited by examiner

Primary Examiner—Donald P. Walsh
Assistant Examiner—Mark J. Beauchaine
(74) Attorney, Agent, or Firm—Keusey, Tutunjian & Bitetto, P.C.

(57) ABSTRACT

A server call system that enables the customer to be in direct contact with the server at all times. A keypad is disposed at customer locations and adapted to receive item requests from the customer. The keypad is in wireless communication with a server pager carried by a designated server. The customer inputs an item request into the keypad and it is sent to a predetermined or dynamically determined server pager for fulfillment. In this manner, not only is the efficiency of the establishment increased by eliminating wait time by customers for submitting a request to their server, but the server can effectively serve more areas with less direct customer contact.

22 Claims, 8 Drawing Sheets

ITEM REQUEST CODES

| 001 | Water | 100 | Lunch Special |
|---|---|---|---|
| 002 | Bread | 101 | Dinner Special |
| 003 | Drinks | 102 | Menu Items |
| 004 | Coffee | ⋮ | ⋮ |
| ⋮ | Espresso | ⋮ | ⋮ |
| ⋮ | Cappucino | ⋮ | ⋮ |

SERVER CALL SYSTEM

CROSS-REFERENCE TO RELATED APPLICATIONS

This application Divisional of U.S. patent application Ser. No. 09/797,764 filed Mar. 5. 2001 now abandon, which is a Continuation-in-Part of U.S. patent application Ser. No. 09/567,454 now U.S. Pat. No. 6,681,109, filed May 8, 2000.

BACKGROUND OF THE INVENTION

1. Field of the Invention

The present invention relates to restaurant services, and more particularly, to a server call system employing wireless communication protocol in a novel manner.

2. Description of the Related Art

One of the primary goals of a restaurant business is to provide prompt, efficient and courteous service to their customers while maintaining food quality. In furtherance of these goals, restaurants often implement electronic systems to help maintain communications between the customer, waiter/server and kitchen.

An example of such system is described in U.S. Pat. No. 4,935,720 which discloses an apparatus for the transmission of information in a restaurant. The apparatus discloses a waiter-restaurant information transfer system in which a principal treatment unit is disposed in the kitchen area. The principal unit includes a set of buttons associated with respective tables or a keyboard that can be operated by food service personnel to provide a display, at a board in the dining room and at a region at which the waiter can pick up prepared food service items. When the waiter responds to the signal at the pickup region, and upon pick up of the food service item, they press a push button or operate a keyboard to cancel the previous display.

U.S. Pat. No. 4,511,161 discloses an identification and control apparatus for service personnel for a restaurant. The disclosed method and apparatus divides the working space of the restaurant into selected stations and for assigning service personnel to these stations. Identification elements are associated with a respective subject layout which comprises a transparent plastic sheet on which are drawn divisions of the restaurant into separate sections and an underlying floor plan showing, on a reduced scale, the physical area of the restaurant. A correlation sheet is secured in proximity to the layout to indicate the particular subject associated with its respective identification element and its station in accordance with the number of stations the restaurant is to be divided at any given time of the day. A plurality of transparent sheets are furnished corresponding to the maximum number of divisions of the restaurant into separate sections.

Both the '720 and '161 patents are directed at organizing restaurant personnel in an effort to maintain an efficient and functional working environment. However, neither the '720 nor '161 patents consider the customer as a factor when implementing an efficient operation scheme. However, one of the most important considerations in a restaurant is their customer service. As such, the customer and the restaurant personnel's service of the customer in an efficient manner is an integral part of successful operation of a restaurant. The most common complaint among restaurant goers is the inability to get the waiter's attention when they would like to order something or request something from their waiter.

U.S. Pat. Nos. 4,250,491 and 5,699,039 disclose various devices for obtaining the waiter/server's attention when the customer requires the same. The '491 patent shows a table signal device that is situated at the customer table and is physically lifted by the customer to signal their need for the waiter/server's attention. A light on the top of the device is illuminated when the customer raises the sign to make it highly visible. The '039 patent discloses a menu stand or similar device that includes a "call waiter" button at its base. When the customer presses the "call waiter" button a thin electroluminescent (EL) surface element mounted on the menu holder that enables the menu holder to be illuminated in order to summon the waiter/server.

The devices disclosed in the '491 and '039 patents require the customer to summon the waiter/server, wait for them to arrive, request the item or items desired and then wait for the waiter to retrieve the requested item(s). This series of events, although common, do not promote, and in fact hinder the efficient operation of a restaurant establishment. Thus, it would be desirable to provide a system that can eliminate this series of inefficient steps and enable the customer to be in direct communication with the waiter during their stay at the restaurant.

SUMMARY OF THE INVENTION

It is therefore an object of the invention to provide a server call system that increases service efficiency in a restaurant establishment.

This and other objects are achieved in accordance with an embodiment of the present invention in which a server call system comprises a customer transmitter disposed at each customer location within a restaurant and a server receiver in wireless communication with said transmitter and being carried by service personnel with the restaurant. The customer transmitter includes an input keypad adapted to receive customer item requests and a display for displaying a plurality of information to the customer. The server receiver includes a display screen for displaying received item requests from said transmitter and at least one of an audible, visual and tactile indicator for indicating when a customer item request has been received from a customer transmitter.

In another embodiment, a central processing station is provided within the restaurant establishment to administrate communication between all customer location transmitters and server receivers. The central processing station includes all processing, memory and wireless communication protocol to administrate the system. The customer transmitters and server receivers can include transponders so as to enable the central station to identify the location of each transmitter and receiver. In this manner, the central station can administrate communication between the customer location transmitters and server receivers by routing customer item requests to the server receiver of the service personnel most closely located to a service area that is to be used to fulfill the customer item request.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the views.

DETAILED DESCRIPTION OF PREFERRED EMBODIMENTS

Figure 1A:
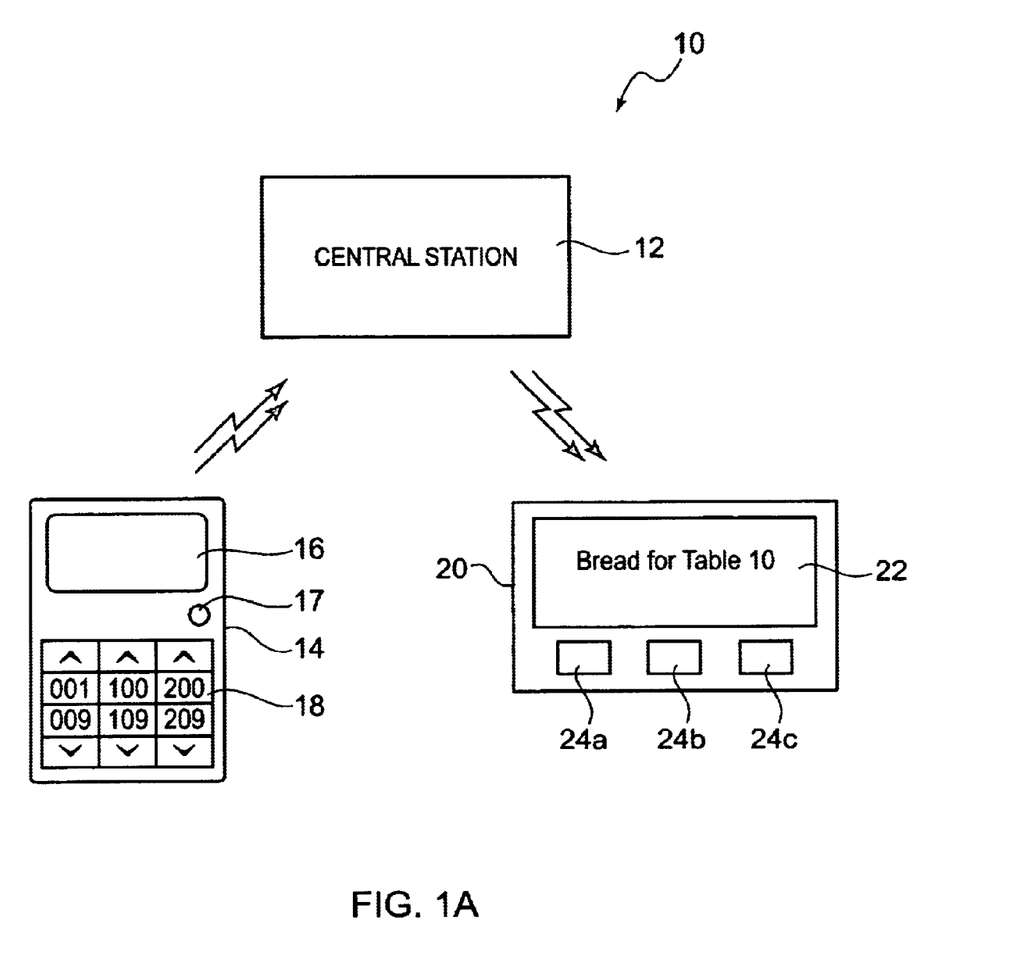
FIG. 1a is a block diagram of the server call system according to a first embodiment of the invention.

Referring to FIG. 1, there is shown the server call system 10 according to an embodiment of the present invention. The server call system 10 includes a plurality of customer keypad devices 14, a central station 12 in wireless communication with keypad devices 14 and a server paging device 20 also in wireless communication with the central station 12. The Wireless Application Protocol (WAP) implemented by central station 12, keypads 14 and paging devices 20 can be any suitable wireless communication protocol. Those of ordinary skill in the art will recognize that WAP is a secure specification that allows user to access information via handheld wireless devices. WAP supports most wireless networks including, for example, CDPD, CDMA, GSM, PDC, UMTS, etc. It is understood that radio frequency (RF) techniques including, but not limited to, Bluetooth and cellular frequency ranges can also be utilized efficiently in the application contemplated herein.

Central station 12 includes all processing, transmitting, receiving and memory systems necessary to maintain and control the wireless network implemented in the server call system of the present invention. Central station can be implemented, by way of example, using a general purpose computer having radio transmission peripheral devices for transmitting and receiving wireless signals to and from the keypads 14 and server pagers 20. Central station 12 can also be a dedicated processing device designed to include all circuitry, processing and memory required for the present application.

Keypad 14 includes a plurality of keys 18 and a display 16 for providing the user with a display of the user selected request and possibly a confirmation of sending and receipt of the user request by the central station 12. The confirmation of the sending of an item request may also be provided by a separate visual indicator 17, such as a light or LED. This confirmation indicator 17 may also serve as an indicator for the restaurant that this customer has input a request and is awaiting its fulfillment. For example, indicator 17 may go on solid after a request has been made, and stay on until the request is fulfilled. In this manner the indicator 17 serves a dual function of confirming the sending of a request, and notifying the surrounding area that such request has been made. The plurality of keys 18 can be numeric, alphanumeric of any suitable combination thereof. The number of keys 18 may be increased or decreased depending on specific applications without departing from the spirit of the present invention. By way of example, keys 18 are shown having numeric ranges and up and down arrows for enabling the user to scroll through items while viewing the same on display 16. Keypad may also include an internal memory (e.g., random access memory—RAM) for storing customer item request codes, which are described hereinbelow with reference to FIG. 3.

The paging device 20 includes a display 22 which provides the server the customer request and their respective location within the restaurant. By way of example, display 22 is shown displaying a message "Bread for table 10" which instructs the server to bring bread to table 10. Display 22 may be any suitable type of display including, for example, liquid crystal displays (LCD). The display 22 can also include illumination means or a backlight for easy viewing in dimly lit surroundings. Paging device 20 may include buttons 24a and 24b for reviewing, deleting, storing or otherwise manipulating data received by paging device 20. In addition, a light 24c may be provided which may blink or otherwise provide an additional visual signal to the server that a customer request has been received. Paging device 20 may also include a vibration mode (tactile indicator) that is activated/deactivated by one of the buttons 24a or 24b or a combination of both.

In operation, the keypad devices 14 are located at each table or other customer locations where customers are expected to sit or wait for service. The seats at a bar could also be examples of such locations. The central station 12 is preferably programmed with the geographic position (i.e. customer location) of each keypad device 14. This geographic position layout is typically the table/seating layout for the respective establishment.

Each server/waiter or other service personnel within the restaurant has their own paging device 20 which is a uniquely addressable device, similar to telephone paging devices, so that it is directly addressable by the central station 12. In this manner, the central station 12 can selectively send signals to one or more of the paging devices in response to received service request criteria from the customer keypads. Central station 12 is programmed to receive the keypad transmitted signals, identify their origin (i.e., the customer location from which the keypad 14 has been actuated), and transmit the customer request to the server pager 20 of the server assigned to that customer location. Accordingly, each customer keypad 14 and signals received therefrom by the central station 12 are identifiable as originating from the table or specific customer location of the keypad 14 within the establishment.

The server carrying paging device 20 is trained to respond to the customer request received via pager 20, thus eliminating the need for customer to obtain the server's attention and subsequently instruct them to retrieve a desired item. In an additional embodiment, a remotely located display connected to the server pager 20 is provided. For example, a remotely located display may be positioned on the server's tray or other convenient location to eliminate the need for the server to go looking at their server pager every time a new customer item request is received. The remotely located display 26 (FIG. 2) is in communication with server pager 20 and as such, can provide a redundant display as that shown on display 22. The disposition of the remotely located display is a matter of design choice, provided it is visually observable by the server, even when their hands are full. This significantly increases the server's ability to efficiently serve the customer and potentially increases the number of customer locations any one server can manage.

Figure 1B:
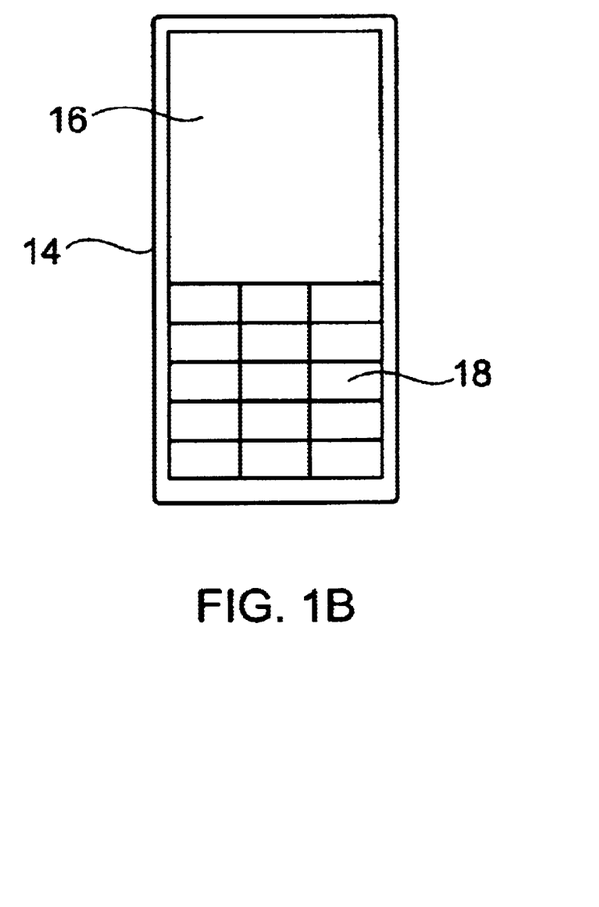
FIG. 1b is a plan view of the customer keypad according to another embodiment of the invention.
Figure 1C:
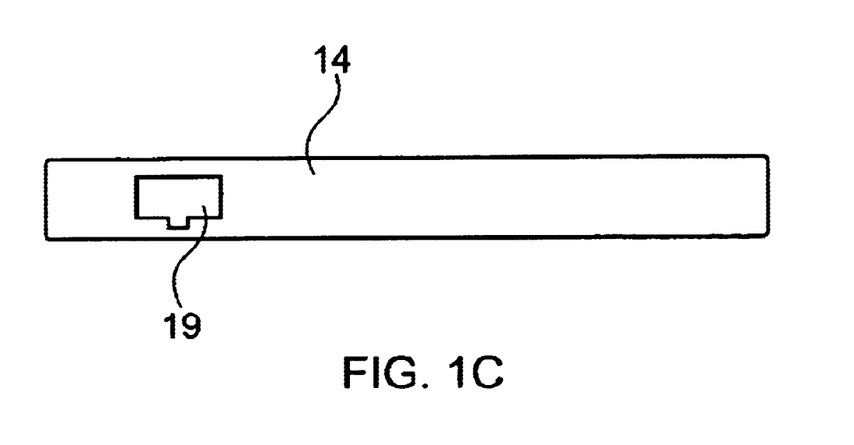
FIG. 1c is a side view of the customer keypad according to another embodiment of the invention.

FIGS. 1b and 1c show various embodiments of the customer keypad 14 according to the invention. In this embodiment, keypad 14 includes a display screen 16 that is touch-sensitive. As such, the plurality of user operable keys 18 are soft-keys that are generated by the keypad 14 and displayed on display 16. The user may then touch the desired soft-key to effect their chosen action. Through the implementation of soft-keys, the keypad 14 can display various different button layouts for each of the menu screens and the functions of the respective soft-keys can be changed as desired. It also allows each restaurant to custom program the layout of each display provided to the customer via keypads 14. FIG. 1c shows a side view of keypad 14 which includes a communication port 19 that provides the customer with the ability to connect their laptop or other computing device to an online service or remotely located personal computer system. Communication port 19 can be, for example, an RJ-11 telephone modem connection port, an RJ-45 data networking connection port, an IEEE 1394 FireWire™ port, fiber optic or any other suitable known type of communication connection port.

Figure 3:
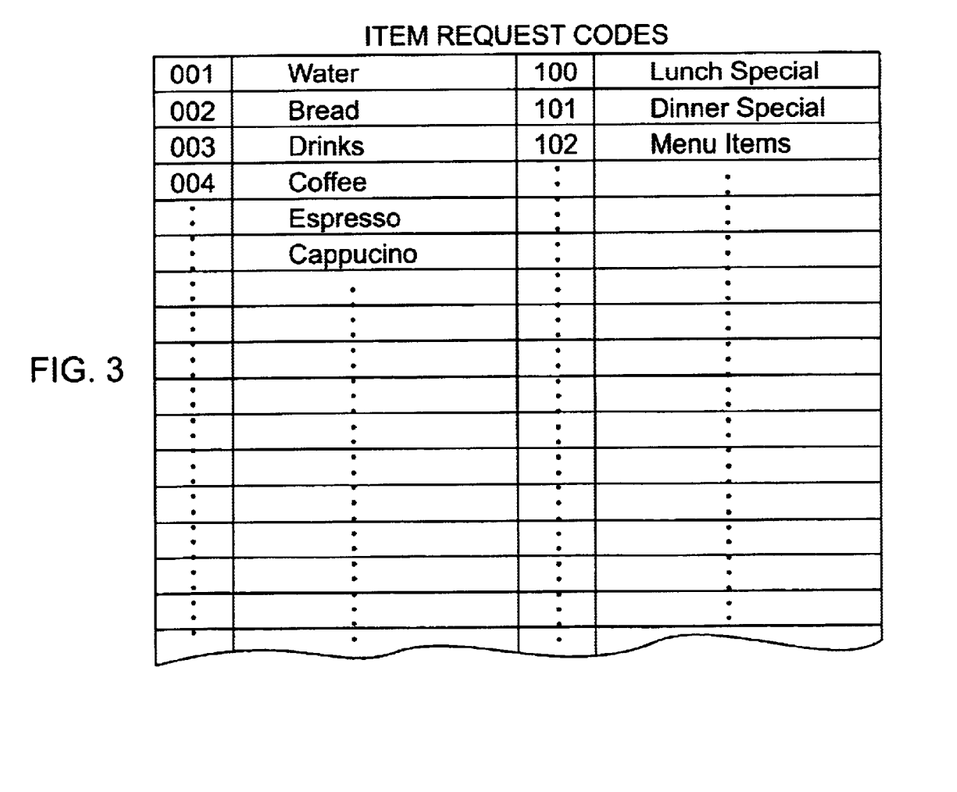
FIG. 3 is an diagrammatic representation of a list of request codes implemented according to an exemplary embodiment of the present invention.

FIG. 3 shows an example of a request code listing that may be a printed sheet located at the respected customer location or may be programmed into the internal memory of keypad 14 and accessible through any suitable operating system, such as, for example, Windows CE®, PalmOS®, EPOC, FLEXOS® and OS/9. One of ordinary skill will recognize that various different operating systems may be used without departing from the spirit of the present invention.

In accordance with a first embodiment of the invention, when a customer inputs a request code into their designated keypad 14, the code will be transmitted to central station which will send the particular request to the server pager 20 to instruct them to fulfill the request by bringing a particular item or service requested to the customer location from which the request originated. The requests can be, for example, ordering menu items or beverages, requesting condiments, requesting the server's attention and requesting the check when appropriate.

Figure 2:
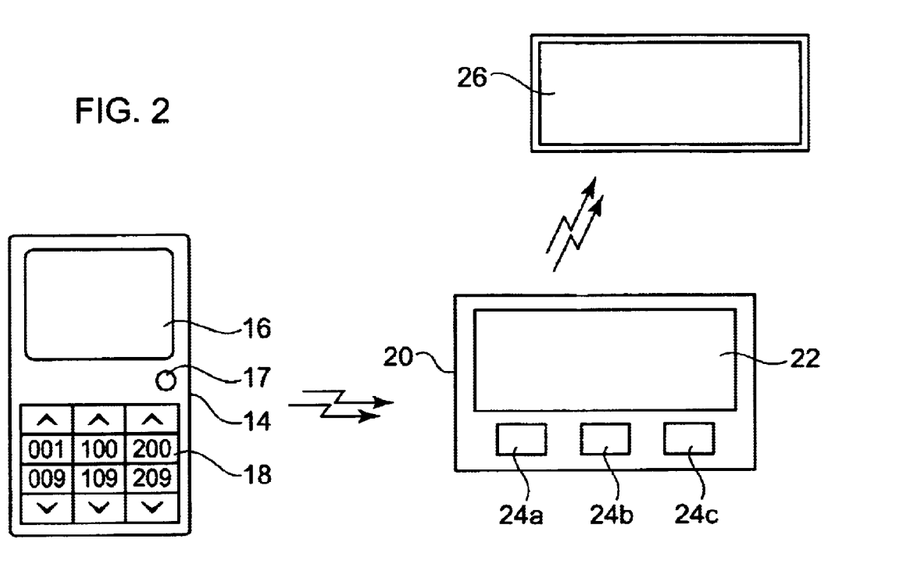
FIG. 2 is a block diagram of the server call system according to a yet another embodiment of the invention.

FIG. 2 shows a second embodiment of the invention where the central station is eliminated and keypad 14 transmits the customer item requests directly to a server pager 20. In this embodiment, the keypads 14 are programmed to transmit the customer requests to a specific server pager 20 of the server handling the pre-designated customer locations. For example, the WAP can be configured such that a select predetermined number of keypads 14 from predetermined customer locations transmit their customer requests directly to a single predetermined server pager 20. In this arrangement, the restaurant or other establishment is divided into customer locations and service personnel is designated to handle groupings of those customer locations. In other words, each predetermined group of customer locations would have keypads 14 that are configured to transmit to one server pager 20 so as to directly address the server personnel handling that group of customer locations. In addition to the customer requests, keypads 14 may also transmit identification information such as, for example "message received from table 2" to the pager 20 so that the server knows the exact origin of the request in case the server has a question for the customer relating to their request.

In another contemplated embodiment, central station 12 can include a people finding feature, or more particularly a service personnel locating system that enables the central station 12 to route an incoming item request from keypad 14 to the pager 20 of the nearest service personnel available to fulfill such request. Examples of people or object locating systems can be found in U.S. Pat. No. 5,455,851, the entire contents of which are incorporated herein by reference. Other personnel locating system that are used in conjunction with telephone systems are disclosed in U.S. Pat. Nos. 5,515,426, 5,822,418 and 6,009,333, each of which are incorporated herein by reference. The PBX as disclosed in these patents may be substituted with the central station of the present invention.

Figure 4:
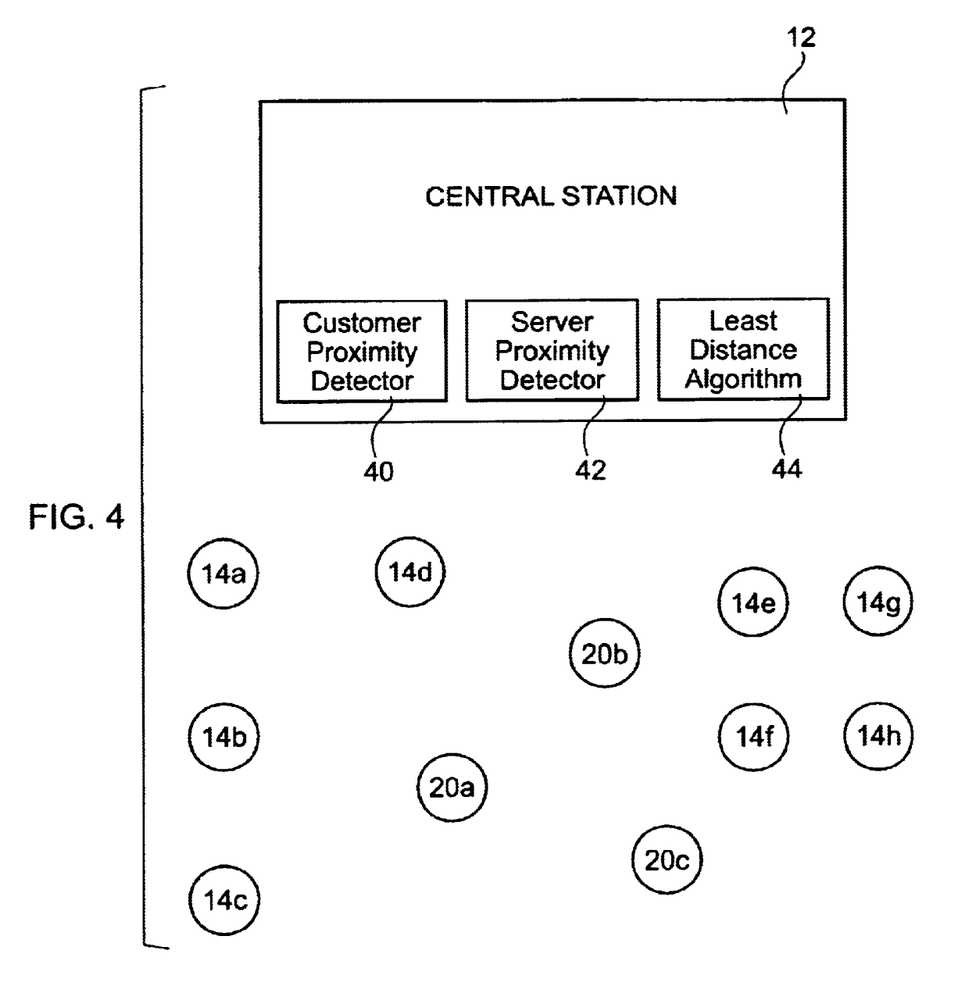
FIG. 4 is a further block diagram of the server call system according to another embodiment of the invention.

In this alternative embodiment, each server pager 20 and customer keypad 14 includes a transponder that enables the central station 12 to identify and monitor the location of each server within the establishment and their proximity to the customer locations and the food service locations (e.g., kitchen or other server stations). FIG. 4 shows a block diagram representation of a plurality of customer locations 14a–14h and a some server pagers 20a–20c scattered within the restaurant establishment. Thus, for example, when a customer inputs a request into their keypad 14a, central station 12 identifies the request and its origin using a customer proximity detector 40 or other processing means, identifies the server pager 20b most closely located to the service station from which the server would retrieve a requested item or fulfill the request, and directs the request to the identified server's pager 20b. In this example, although server pager 20a is physically closer to customer location 14a, central station routes the customer request to server pager 20b because it has been determined by central station 12 that the server carrying pager 20b is closer to the service area for fulfilling the customer 14a request.

Central station 12 includes a server proximity detector or other similar processing means to dynamically determine the location of each server pager 20 within the establishment, and a least distance algorithm or processor 44 for determining the respective distances between the server pagers and predetermined service areas within the restaurant.

Central station 12 can also be configured to send specific item requests such as food and beverage requests directly to the kitchen and bar, respectively, with subsequent notification to a selected server upon expiration of a predetermined time or receipt by the central station of a completion notice sent from the kitchen or bar when the request has been fulfilled.

In this embodiment, the customer locations need not be grouped or otherwise identified within central station prior to operation of the system. Through the use of transponders, central station 12 will identify the geographic origin of the customer's item request and use that information to route the request to the closest service personnel.

Figure 5:
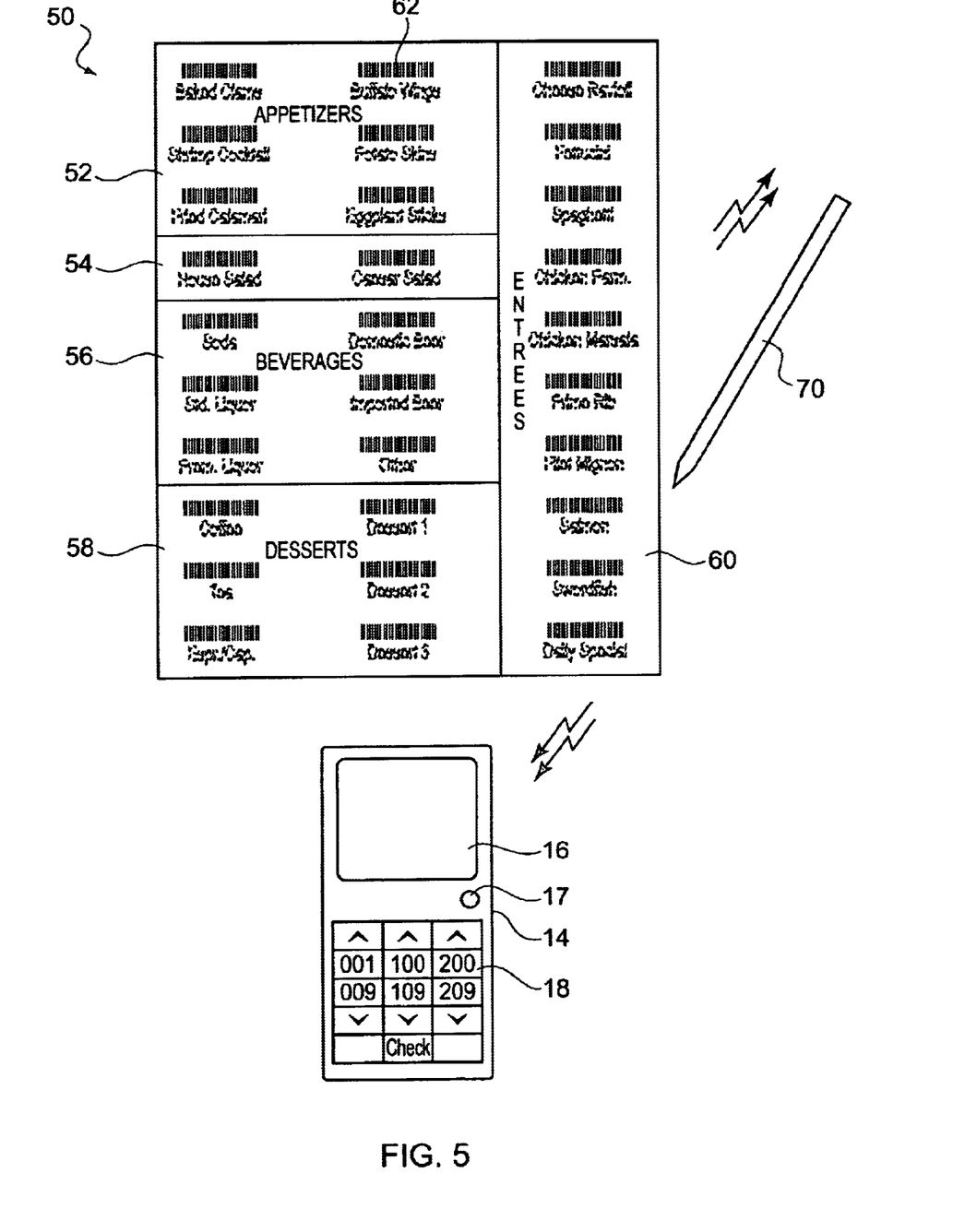
FIG. 5 is a block diagram of a server system according to another embodiment of the invention.

FIG. 5 shows another embodiment of an increased efficiency service system for restaurant applications. As with the previous embodiments, keypad devices 14 are situated at each customer location within the restaurant and include a plurality of different buttons, including a server call button for obtaining the attention of a server. When the server call button is depressed, the server is notified using the pager 20 they are carrying. In addition, the server will carry a clip board or other type of pad having a sheet 50 containing a plurality of barcodes 62, each associated with a particular menu item. Sheet 50 can be broken down into sections by menu item. For example, section 52 are appetizers, section 54 are salads, section 56 are beverages, section 58 are desserts, and section 60 are entrées. The server's clip board or pad includes a light pen 70 that enables the server to scan the barcode according to the customers' desired order. An example of light pen 70 is shown in U.S. Pat. No. 5,508,504, the entire contents of which are incorporated herein by reference.

During operation, light pen 70 and customer keypad 14 are in wireless communication with the central station 12 (FIGS. 1 and 3). When the customer places their order with the server, the server uses light pen 70 to scan the barcodes 62 corresponding to the customer's request. Once scanned, the customer's order is transmitted to the central station, which not only processes the order information for purposes of fulfillment, but also transmits that information to the customers keypad display 16. Thus, display 16 will display the customer's order as it is placed. In addition to the ordered items, a running total of the order and other information can be displayed on display 16. The use of a barcode sheet 50 enables the restaurant establishment to easily change the menu by simply programming the central station accordingly and providing the server with an updated barcode sheet 50. In addition, one or more barcodes can be supplied for one or more daily specials without requiring a new sheet 50. In this manner, the central station would be re-programmed for the daily special and therefore when the server scans the daily special barcode, it will register the newly programmed daily special.

Figure 6:
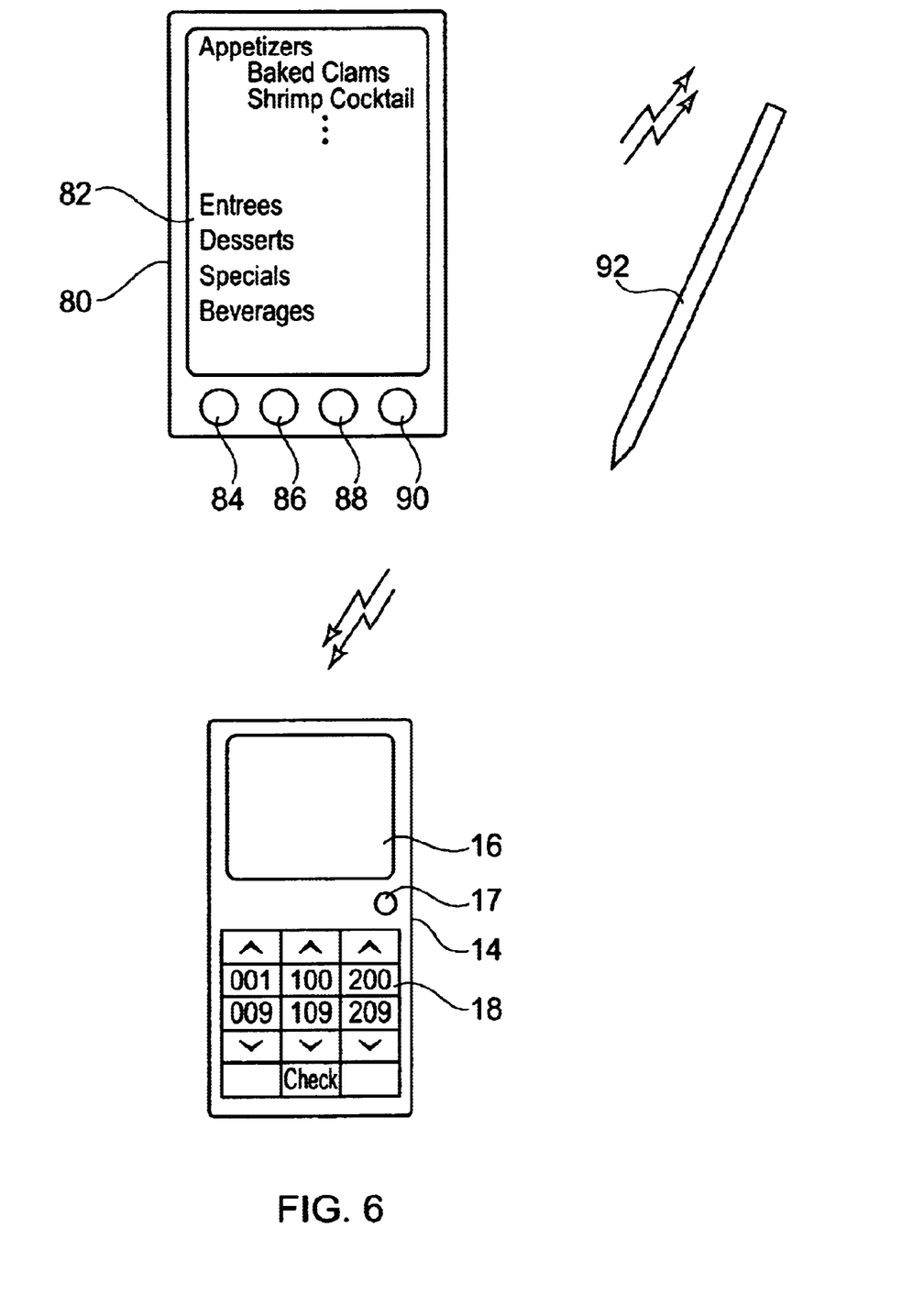
FIG. 6 is a block diagram of the server system according to yet another embodiment of the invention.

In accordance with another embodiment shown in FIG. 6, rather than a barcode sheet, the server carries a personal digital assistant (PDA) type device 80 having a touch sensitive screen 82 and a plurality of buttons 84, 86, 88 and 90. Buttons 84, 86, 88 and 90 can provide a plurality of additional functions, such as, for example, sending the order after placed and input by the server, deleting an ordered item, providing additional information relating to a menu item (e.g., nutritional information, ingredients, how prepared), etc. A pen device 92 is included with the PDA 80 for inputting information directly onto the screen 82. PDA 80 can be any suitable known type device, such as, for example a PALM® device. The interface between the server and the PDA 80 can be menu driven or may include handwriting recognition applications. As is known in the art, the PDA can be programmed with a plurality of menu items, similar to a WINDOWS® environment, where each category of menu items is listed. When the server uses pen 92 to touch one of the menu items listed, another drop down menu appears listing all the sub-selections available for that menu item. For example, the menu list may be broad menu headings like appetizers, entrees, deserts, specials, etc. When the server touches appetizers with the pen 92, another list pops up listing each of the appetizers available for ordering. A subsequent selection of one from the list will result in the placing of the order. PDA 80 is in wireless communication with the central station and the customer keypad device 14 such that the customer's order is displayed on display 16 as their order is placed. This will enable the customer to see a running total of their order and confirm that their order has be placed as desired.

Figure 7:
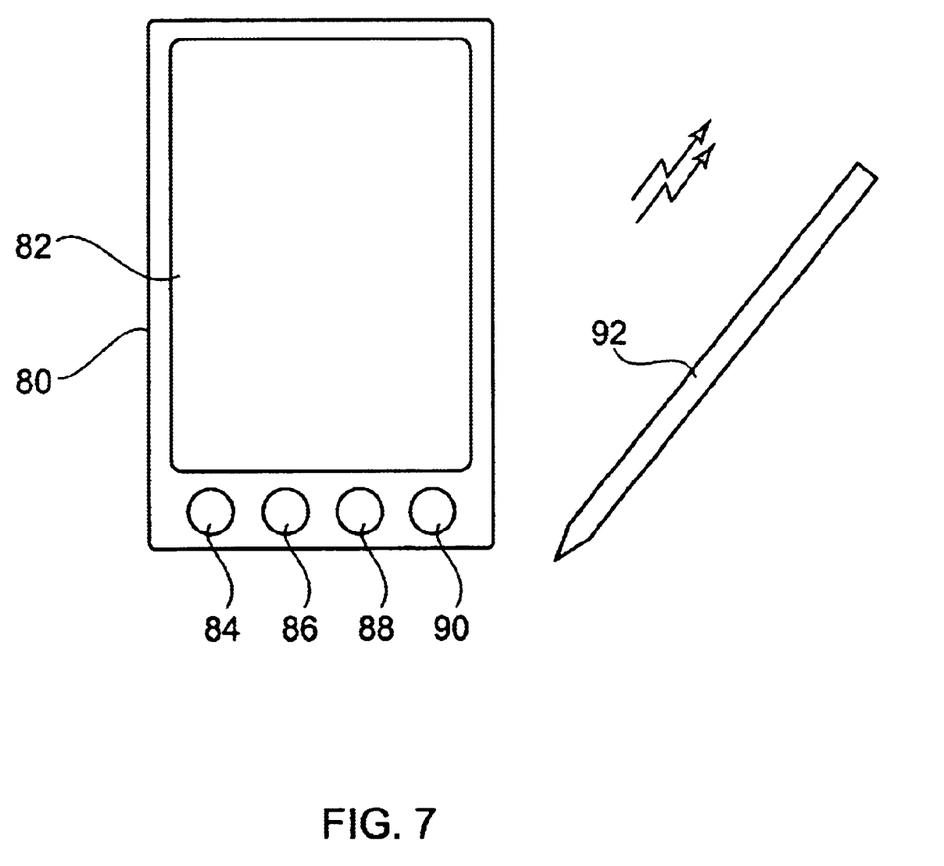
FIG. 7 is a block diagram of the server system according to another embodiment of the invention.

FIG. 7 shows PDA device 80 that may be alternatively positioned at each customer location. In this embodiment the customer will input their order using pen 92 and PDA display 82. This input can be in the menu driven example described in accordance with the embodiment shown in FIG. 6, or may be a handwritten recognition type input. The customer will have instructions at the customer location for inputting and sending their order information to the central station via PDA 80. The handwriting recognition utilized with the PDA can be, for example, the Graffitti™ handwriting recognition as currently available with PALM devices, or may include any other suitable known available handwriting recognition software that enables the user to substantially handwrite their orders or requests into the PDA 80.

In this embodiment, the customer will also be able to obtain additional information relating to the items ordered. This other information can include nutritional information relating to the ordered items and may also include photographs of the ordered items. The nutritional information may be, for example, a breakdown of the ingredients, calories, fat content, carbohydrates, protein, etc., and may also include the preparation details of each menu item. It is also contemplated that the customer will be able to review the nutritional, preparation and photographic information relating to the menu items prior to ordering the same.

According to a further embodiment of the invention, the customer keypads 14 include game programming information and will provide the customer with the additional ability to play games at their customer location using the keypad. The type of game and programming is a matter of design choice and is preferably determined by the restaurant establishment in which the keypads 14 are disposed. It is contemplated that a gaming company such as, for example, Nintendo of America, Inc., could provide the necessary programming and/or gaming capabilities for the keypad 14. Those of ordinary skill in the art will recognize that there are many different types of games and manners of implementation, too exhaustive to list here. It is understood that the game programming can include removable cartridges or may be simply programmed into the keypads 14.

Figure 8:
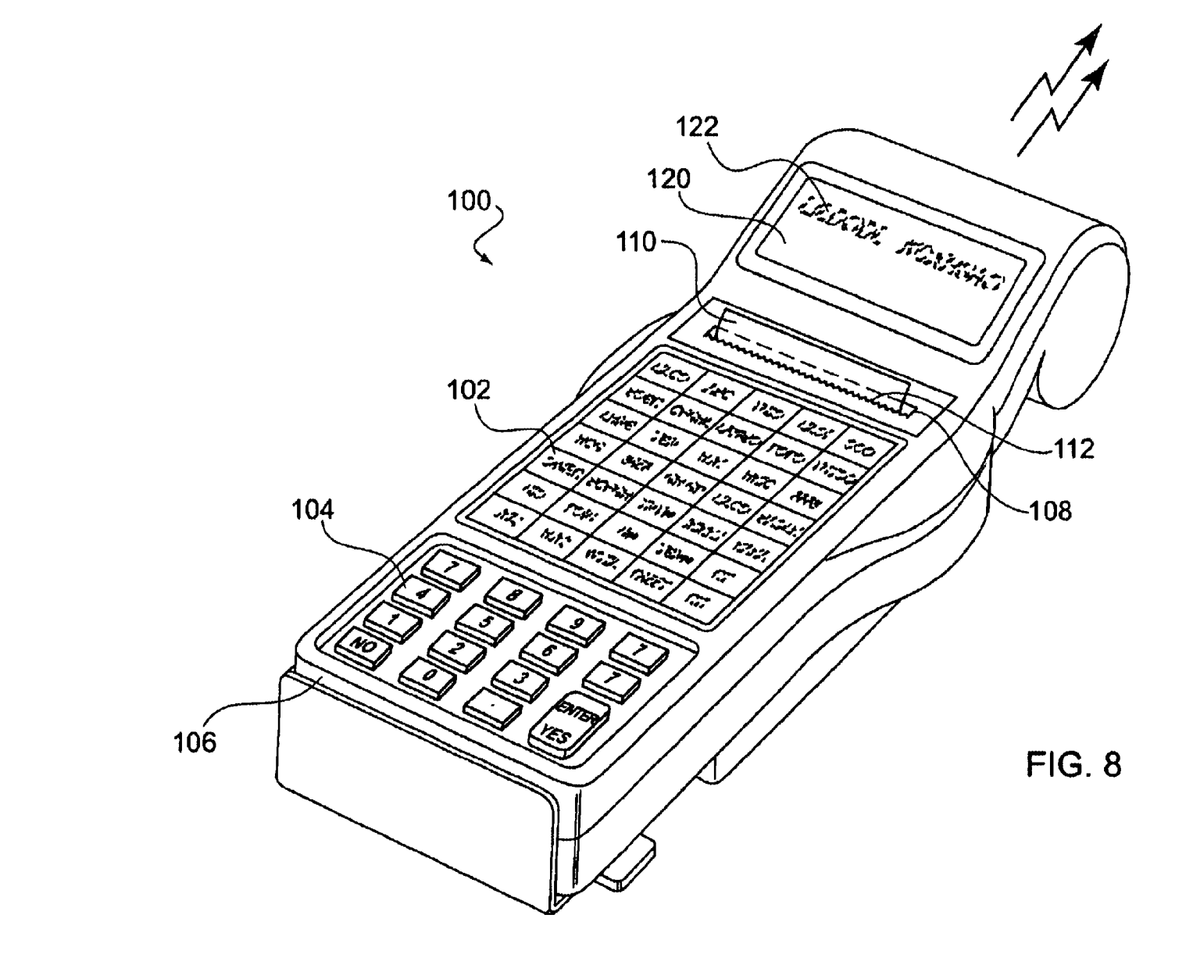
FIG. 8 is a perspective view of a server portable point of sale system according to an embodiment of the invention.

FIG. 8 shows another embodiment of the invention where a portable ordering/ order processing device 100 is implemented and in wireless communication with the central station. This point of sale device and its operation is disclosed in U.S. Pat. No. 5,489,773, which is incorporated herein by reference. According to an embodiment of the invention, device 100 is disposed at each customer location and includes a plurality of input buttons 102 corresponding to each menu item available for ordering, a keypad 104 for use in conjunction with the input buttons 102 and a display 120 for displaying information relating to menu items and ordered items. In addition to enabling the customer to place their order and see information relating to the menu items, device 100 can provide the customer with a credit card reader mechanism 106, a printer 108 for printing a receipt 1 10 and corresponding perforated edge 112 for tearing of the receipt 110. Through the use of the credit card reader 106, the customer may obtain and pay their check without requiring interaction with the server.

In accordance with another embodiment, device 100 may be carried by the server and be in wireless communication with the central station and the customer keypad 14 at each customer location. In this manner, the server can operate device 100, while the customer receives simultaneous confirmation on their display 16. As mentioned previously, the customer will be able to access additional information relating to the menu items and their order on keypad 14 and display 16.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A restaurant service system comprising:
    a server list having a plurality of barcodes corresponding to menu items;
    a server scanning device for scanning barcodes corresponding to a customer's order;
    a customer keypad and display device disposed at customer locations within the restaurant for permitting a customer to enter an order;
    a central station processing means in communication with said scanning device, wherein said display on said customer keypad provides a display of the customer's ordered items as they are scanned by the server using said server scanning device; and
    a server receiver in communication with said customer keypad via said central station and being carried by service personnel within the restaurant, wherein said customer keypad includes a server call button for sending a call signal to said server receiver to obtain the attention of the server.

2. The restaurant service system according to claim 1, wherein said scanning device comprises a light pen.

3. The restaurant service system according to claim 1, wherein said customer keypad and display provides the customer with a display of the ordered items as the server scans the corresponding barcode from the server list and further includes additional information relating to the menu items.

4. The restaurant service system according to claim 3, wherein the displayed ordered items includes a running cost total of the customer's order.

5. The restaurant service system according to claim 1, wherein said customer keypad further comprises a data port.

6. The restaurant service system according to claim 5, wherein said data port comprises at least one selected from a group consisting of an RJ-11 modem connection port, an RJ-45 network connection port, an IEEE 1394 Fire Wire port and a Universal Serial Bus (USB) port.

7. The restaurant service system according to claim 1, wherein said customer keypad further comprises handwriting recognition capabilities, wherein the customer may handwrite their order on said customer keypad display.

8. The restaurant service system according to claim 1, wherein said customer keypad further comprises a game mode providing the customer with game capabilities at each customer location.

9. The restaurant system of claim 1, wherein the central station further comprises a server proximity detector to dynamically determine the location of each server receiver within the restaurant.

10. A restaurant service system comprising:
    a server personal digital assistant (PDA) programmed to include each menu item offered to a customer and having an input pen for inputting information into the server PDA and a plurality of buttons for selectively controlling the server's input of a customer's order, said server PDA being carried by server personnel in the restaurant;
    a customer keypad and display device disposed at customer locations within the restaurant for permitting a customer to enter an order; and
    processing means in communication with the customer keypad and said server PDA, wherein said display on said customer keypad provides a display of the customer's ordered items as they are entered by each server personnel into the server PDA.

11. The restaurant service system according to claim 10, wherein said server PDA is in direct wireless communication with the customer keypad.

12. The restaurant service system according to claim 10, wherein said customer keypad and display provides the customer with a display of the ordered items as the server scans a corresponding barcode from a server list and further includes additional information relating to the menu items.

13. The restaurant service system according to claim 12, wherein said additional information comprises nutritional, preparation, and photographic information relating to each menu item.

14. The restaurant service system according to claim 12, wherein the displayed ordered items includes a running total of the customer's order.

15. The restaurant service system according to claim 10, wherein said customer keypad further comprises a data port.

16. The restaurant service system according to claim 15, wherein said data port comprises at least one selected from a group consisting of an RJ-11 modem connection port, an RJ-45 network connection port, an IEEE 1394 Fire Wire port and a Universal Serial Bus (USB) port.

17. The restaurant service system according to claim 10, wherein said customer keypad further comprises handwriting recognition capabilities, wherein the customer may handwrite their order on said customer keypad display.

18. The restaurant system of claim 10, further comprising a server pager carried by said server personnel and being in communication with the processing means, wherein the customer keypad further comprises a server call button for sending a call signal to said server pager to obtain the attention of the server personnel.

19. The restaurant system of claim 18, wherein the processing means further comprises a server proximity detector to dynamically determine the location of each server pager within the restaurant.

20. A server call system comprising:
    a server receiver having a display carried by a server personnel for receiving and displaying received item requests;
    a customer transmitter and display device disposed at a customer location for permitting a customer to enter at least one order item request to be sent to said server receiver, the customer transmitter and display device being in wireless communication with said receiver and including a server call button for sending a call signal to said server receiver, wherein the customer display provides a display of and information pertaining to the at least one order item after it is placed.

21. The server system of claim 20, further comprising a remotely located display in operable connection with said server receiver.

22. The server system of claim 20, further comprising a central station in communication with said server receiver and customer transmitter, said central station further comprising a server proximity detector to dynamically determine the location of each server receiver within the restaurant.

* * * * *